UNITED STATES PATENT OFFICE.

ARTHUR N. McKAY AND WILLIAM L. WILLIS, OF HOUSTON, TEXAS.

LIQUID COATING COMPOSITION.

1,356,380.　　　　Specification of Letters Patent.　　Patented Oct. 19, 1920.

No Drawing.　　Application filed November 21, 1917. Serial No. 203,184.

*To all whom it may concern:*

Be it known that we, ARTHUR N. McKAY and WILLIAM L. WILLIS, citizens of the United States, residing at Houston, in the county of Harris and State of Texas, have invented certain new and useful Improvements in Liquid Coating Compositions, of which the following is a specification.

This invention relates to liquid coating compositions and the invention has more especial reference to a non-inflammable paint and the process of making the same.

The invention has for its dominant object to provide a paint which is of such a nature as will permit the same to withstand a much higher degree of heat than paint heretofore marketed and which, will not crack or scale and further, will prevent the rusting of the surface coated therewith.

Another and equally important object of the invention is to provide a paint of the character mentioned which during the process of making, gives off a combustible by-product capable of being used as a thinner or drier for paints and varnishes; as an ingredient in the manufacture of munitions due to its highly explosive state, and further, as an efficient insecticide for use on live stock.

It is also an object of the invention to provide a paint which when reduced to a certain consistency and mixed with the proper proportions of the by-product given off during the distilling of the same, will afford a highly desirable wood preservative.

Yet another object of the invention is to provide a paint of the character mentioned which, due to the resinous qualities thereof will, when mixed with the above-mentioned by-product, produce an effective insecticide capable of being sprayed onto live stock and serving to keep flies therefrom.

Other objects will be in part obvious and in part pointed out hereinafter.

The invention consists, furthermore, in the ingredients of the composition, the by-product given off thereby during the process of making and the various uses of the composition and by-product, all of which will be more fully described in the following specification, and then finally embodied in the clauses of the claim which are appended to the specification and which form an essential part of the same.

The composition in its preferred embodiment includes the following:—Tar, oil, holder oil, caustic soda dissolved in water, permanganate of potash dissolved in water.

By way of explaining the materials used in making the improved coating composition and the manner in which they are derived, it may be stated that tar oil is obtained from gas plants where gas is manufactured by the well known Lowe process, wherein gas is obtained from coke and a certain percentage of petroleum oil. This tar oil is the residue from such process and has heretofore being considered a waste and consequently of but little value.

Holder oil is also obtained from gas plants and is yet another residue of the process of manufacturing Pintsch gas and is a thin oily matter, which also has had no value heretofore.

Drip oil is obtained from gas plants where gas is manufactured from coal tar by the coke oven process and is similar to tar oil hereinbefore mentioned. Therefore, dry oil and tar oil being the same, can be used, in so far as the manufacturing of the improved product is concerned. Hence, I desire to have it understood that either of these oils may be used without departing from the scope of my invention.

In the process of making or distilling the composition, the conventional design of still commonly used for the distillation of crude oil is used and therefore, no special machinery is required. Five hundred (500) gallons of tar oil or drip oil together with 500 gallons of holder oil are placed in the still when the same is cold and thoroughly mixed, whereupon 25 pounds of caustic soda dissolved in water is added. After this, 12½ pounds of potassium permanganate dissolved in water to form a solution is mixed with 12½ pounds of unslaked white lime, slaked in water of sufficient quantity to make 12 gallons, the same then being added to the composition. The still is now heated to approximately 200° Fahrenheit and kept as near this temperature as possible for a period of time covering 6 to 8 hours, during which time a distillate, known to me as turpo, will come over the still. This by-product which I term turpo is of a thin liquid consistency which is light amber in color and is similar to gasolene or turpentine, thus rendering the same desirable for use as a thinner or drier in paints and varnishes. Further, due to the highly combustible state of the by-product, the same can be advantageously used as an ingredient in the manufacture of munitions.

The material left in the still after the by-product has ceased to flow is now kept at a temperature of approximately 150° Fahrenheit until all the water therein is evaporated. As this time, the improved coating composition remains and has its consistency regulated by the amount of the by-product taken therefrom.

The coating composition thus made affords when applied a paint which will not only stand a much higher degree of heat than other similar compositions heretofore marketed, but also will present an exposed surface having the required toughness, yet one which will not crack or scale and will positively prevent rusting of the surface coated therewith, a body of the composition when dried being impervious to moisture or water and at the same time possesses free elasticity and flexibility.

By mixing a certain percentage of the by-product with the coating composition, I am enabled to produce a highly efficient wood preservative.

My improved coating composition is especially desirable for coating the surfaces of boilers, smoke stacks and the like, although it is to be understood that the uses to which the same may be adapted are practically unlimited.

I claim:—

1. A base for coating compositions including tar oil and holder oil.

2. A liquid coating composition which is the residue from the distillation of a mixture of hydrocarbons, a caustic soda solution, and potassium permanganate, which, when applied, is heat resisting, does not crack or scale, is impervious to moisture and water, and affords a tough outer surface with the body as a whole, freely elastic and flexible.

3. The herein process for making a liquid coating composition consisting of placing tar oil, holder oil in a cold still and mixing the same and then adding granulated caustic soda dissolved in water, potassium permanganate dissolved in water and unslaked white lime slaked in water, wherein the same is heated to approximately 200° Fahrenheit causing a by-product to flow from the still, after which the composition is maintained at a temperature of approximately 150° Fahrenheit until all water is evaporated.

4. A liquid coating composition made according to claim 3, having the qualities when applied of withstanding high heat without cracking or scaling, water and moisture proof and affording a tough surface with the body as a whole, freely elastic and flexible.

In testimony whereof, we affix our signatures hereto.

ARTHUR N. McKAY.
WILLIAM L. WILLIS.